(12) United States Patent
Yu et al.

(10) Patent No.: US 9,648,384 B2
(45) Date of Patent: May 9, 2017

(54) APPARATUS AND METHOD FOR SEARCHING BROADCAST CHANNEL

(71) Applicant: SOLUM CO., LTD, Suwon-si, Gyeonggi-Do (KR)

(72) Inventors: Seong Jun Yu, Suwon-si (KR); Joon Kook Kim, Suwon-si (KR)

(73) Assignee: SOLUM CO., LTD., Suwon-si (KR)

( * ) Notice: Subject to any disclaimer, the term of this patent is extended or adjusted under 35 U.S.C. 154(b) by 190 days.

(21) Appl. No.: 14/265,974

(22) Filed: Apr. 30, 2014

(65) Prior Publication Data

US 2015/0172753 A1 Jun. 18, 2015

(30) Foreign Application Priority Data

Dec. 12, 2013 (KR) .................. 10-2013-0154542

(51) Int. Cl.
| | |
|---|---|
| H04N 5/445 | (2011.01) |
| H04N 7/173 | (2011.01) |
| H04N 21/438 | (2011.01) |
| H04N 21/434 | (2011.01) |
| H04N 21/482 | (2011.01) |
| H04N 5/50 | (2006.01) |
| H04N 21/426 | (2011.01) |

(52) U.S. Cl.
CPC .......... *H04N 21/4383* (2013.01); *H04N 5/50* (2013.01); *H04N 21/426* (2013.01); *H04N 21/4345* (2013.01); *H04N 21/482* (2013.01); *H04N 21/4826* (2013.01)

(58) Field of Classification Search
CPC ..................... H04N 21/4263; H04N 21/42638
USPC ..................................................... 725/58, 116
See application file for complete search history.

(56) References Cited

U.S. PATENT DOCUMENTS

| | | | | |
|---|---|---|---|---|
| 5,801,787 A | * | 9/1998 | Schein | ............... H04N 5/44543 348/589 |
| 2003/0051246 A1 | * | 3/2003 | Wilder | ............... H04N 5/44543 725/49 |
| 2005/0134747 A1 | | 6/2005 | Seo | |
| 2005/0289593 A1 | * | 12/2005 | Spilo | .................. H04N 5/44543 725/45 |
| 2006/0282857 A1 | * | 12/2006 | Kim | ...................... H04H 60/39 725/48 |
| 2010/0146077 A1 | * | 6/2010 | Davies | ............. G06F 17/30817 709/219 |

(Continued)

FOREIGN PATENT DOCUMENTS

| | | |
|---|---|---|
| KR | 1997-0078509 A | 12/1997 |
| KR | 10-2004-0096015 A | 11/2004 |

(Continued)

*Primary Examiner* — Pankaj Kumar
*Assistant Examiner* — Franklin Andramuno
(74) *Attorney, Agent, or Firm* — Goldilocks Zone IP Law (57) ABSTRACT

An apparatus for searching a broadcast channel may include a channel searching unit including first and second channel searching units searching broadcast channels of broadcast signals received from antennas, and a controlling unit controlling the first channel searching unit to search broadcast channels included in a first broadcasting standard, controlling the second channel searching unit to search broadcast channels included in a second broadcasting standard, and receiving searching results from the first and second channel searching units to generate effective channel list information.

13 Claims, 5 Drawing Sheets

(56) References Cited

U.S. PATENT DOCUMENTS

| | | | | |
|---|---|---|---|---|
| 2013/0090125 A1* | 4/2013 | Clifton | ................. | H04W 16/14 455/452.1 |
| 2013/0305293 A1* | 11/2013 | Watanabe | .......... | H04N 5/44543 725/58 |
| 2015/0020140 A1* | 1/2015 | Takaki | .................. | H04H 60/42 725/116 |

FOREIGN PATENT DOCUMENTS

| | | |
|---|---|---|
| KR | 10-2005-0062712 A | 6/2005 |
| KR | 10-2007-0030626 A | 3/2007 |
| KR | 10-2012-0043506 A | 5/2012 |

* cited by examiner


APPARATUS AND METHOD FOR SEARCHING BROADCAST CHANNEL

CROSS-REFERENCE TO RELATED APPLICATION

This application claims the benefit of Korean Patent Application No. 10-2013-0154542 filed on Dec. 12, 2013, with the Korean Intellectual Property Office, the disclosure of which is incorporated herein by reference.

BACKGROUND

The present disclosure relates to an apparatus and a method for searching a broadcast channel.

Generally, broadcast receiving apparatuses such as a television (TV), a set-top box, and the like, include an auto-scan function for searching for effective broadcast channels among a plurality of broadcast channels from a broadcast signal received through an antenna, configuring a channel list using information on the searched effective channels, storing the channel list in a memory.

The channel list stored as described above is used at the time of controlling a channel related operation.

Recently, as terrestrial broadcasting, satellite broadcasting, cable broadcasting, and the like, have been digitalized, a large number of digital broadcasting standards have been created, and it has come to be expected that the number of channels per digital broadcast standard will be several times to tens of times the number of channels present in analog broadcasts.

Therefore, a broadcast receiving apparatus receiving a digital broadcast requires a significant amount of time to perform a channel searching operation.

According to the related art, when the channel searching operation is performed, the channel searching operation is sequentially performed per broadcasting standard on broadcast channels included in all broadcasting standards to generate effective channel list information for the broadcast, such that a large amount of time is required.

SUMMARY

An exemplary embodiment in the present disclosure may provide an apparatus and a method for searching a broadcast channel capable of decreasing a channel searching time by searching broadcast channels for each of a plurality of broadcasting standards in parallel using a plurality of channel searching units.

According to an exemplary embodiment in the present disclosure, an apparatus for searching a broadcast channel may include: a channel searching unit including first and second channel searching units searching broadcast channels of broadcast signals received from antennas; and a controlling unit controlling the first channel searching unit to search broadcast channels included in a first broadcasting standard, controlling the second channel searching unit to search broadcast channels included in a second broadcasting standard, and receiving searching results from the first and second channel searching units to generate effective channel list information.

The first broadcasting standard or the second broadcasting standard may be any one of digital video broadcasting-terrestrial (DVB-T), DVB-T2, digital video broadcasting-cable (DVB-C), DVB-C2, digital video broadcasting-satellite (DVB-S), and DVB-S2.

The first broadcasting standard or the second broadcasting standard may be any one of integrated service digital broadcasting-terrestrial (ISDB-T), DVB-T, DVB-T2, DVB-C, DVB-C2, DVB-S, and DVB-S2.

The first broadcasting standard or the second broadcasting standard may be any one of advanced television system committee (ATSC), Opencable, DVB-S, and DVB-S2.

The first broadcasting standard or the second broadcasting standard may be any one of digital terrestrial multimedia broadcast (DTMB) and DVB-C.

The first channel searching unit may include: a tuner generating center frequency signals for each preset frequency band from the broadcast signals; and a demodulator demodulating the center frequency signals to output channel information.

The second channel searching unit may include: a tuner generating center frequency signals for each preset frequency band from the broadcast signals; and a demodulator demodulating the center frequency signals to output channel information.

The controlling unit may divide a frequency band of the broadcast signal into a first region and a second region, control the first channel searching unit to search broadcast channels included in the first region, and control the second channel searching unit to search broadcast channels included in the second region, in the case in which the first and second channel searching units search broadcast channels included in the same broadcasting standard.

According to an exemplary embodiment in the present disclosure, an apparatus for searching a broadcast channel may include: a plurality of channel searching units searching broadcast channels of broadcast signals received from antennas; and controlling unit controlling the plurality of channel searching units to search broadcast channels included in different broadcasting standards, respectively, and receiving searching results from the plurality of channel searching units to generate effective channel list information.

Each of the plurality of channel searching units may include: a tuner generating center frequency signals for each preset frequency band from the broadcast signals; and a demodulator demodulating the center frequency signals to output channel information.

The controlling unit may control the plurality of channel searching units to sequentially search the broadcast channels in a first direction, and control a channel searching unit first ending searching of the broadcast channels to sequentially search broadcast channels included in a broadcasting standard searched by a channel searching unit by which searching of the broadcast channels is the slowest among the plurality of channel searching units in a second direction, in the case in which any one of the plurality of channel searching units first ends the searching of the broadcast channels.

The first broadcasting standard or the second broadcasting standard may be any one of DVB-T, DVB-T2, DVB-C, DVB-C2, DVB-S, and DVB-S2.

The first broadcasting standard or the second broadcasting standard may be any one of ISDB-T, DVB-T, DVB-T2, DVB-C, DVB-C2, DVB-S, and DVB-S2.

The first broadcasting standard or the second broadcasting standard may be any one of ATSC, Opencable, DVB-S, and DVB-S2.

The first broadcasting standard or the second broadcasting standard may be any one of DTMB and DVB-C.

According to an exemplary embodiment in the present disclosure, a method for searching a broadcast channel, may include: receiving broadcast signals; searching broadcast channels for each of a plurality of broadcasting standards in parallel from the broadcast signals; and generating effective channel list information of the broadcast channels for each of the plurality of broadcasting standards in the case in which the searching of the broadcast channels for each of the plurality of broadcasting standards ends.

The searching of the broadcast channels may include: generating center frequency signals for preset frequency bands from the broadcast signals; and demodulating the generated center frequency signals to output channel information.

BRIEF DESCRIPTION OF DRAWINGS

The above and other aspects, features and other advantages of the present disclosure will be more clearly understood from the following detailed description taken in conjunction with the accompanying drawings, in which.

DETAILED DESCRIPTION

Hereinafter, embodiments of the present disclosure will be described in detail with reference to the accompanying drawings. The disclosure may, however, be embodied in many different forms and should not be construed as being limited to the embodiments set forth herein. Rather, these embodiments are provided so that this disclosure will be thorough and complete, and will fully convey the scope of the disclosure to those skilled in the art. Throughout the drawings, the same or like reference numerals will be used to designate the same or like elements.

Figure 1:
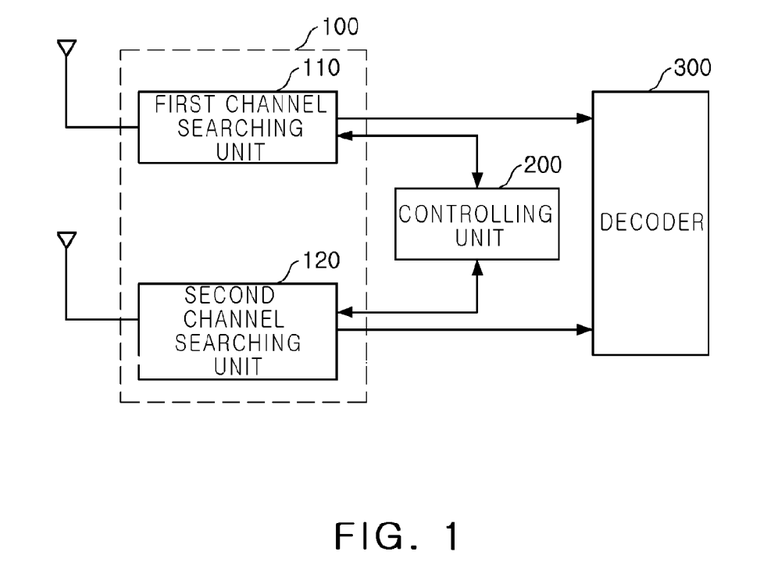
FIG. 1 is a configuration diagram illustrating an example of an apparatus for searching a broadcast channel according to an exemplary embodiment of the present disclosure.
Figure 2:
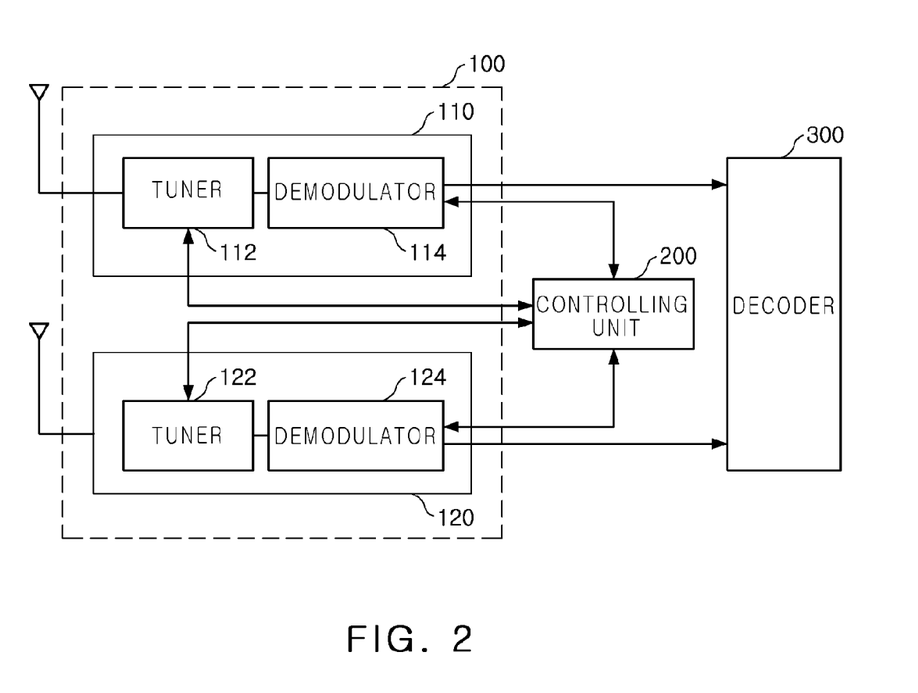
FIG. 2 is a configuration diagram illustrating an example of a channel searching unit illustrated in FIG. 1.
Figure 3:
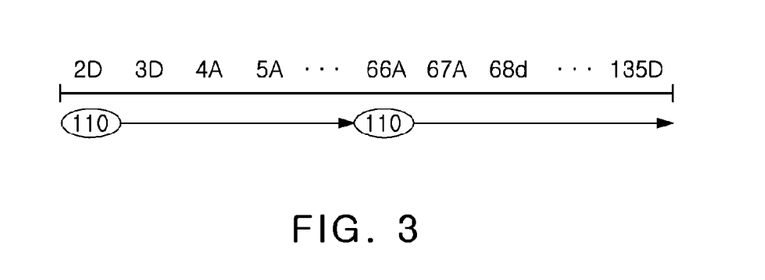
FIG. 3 is a diagram illustrating an example of broadcast channel searching directions of a first channel searching unit and a second channel searching unit of FIG. 1.

FIG. 1 is a configuration diagram illustrating an apparatus for searching a broadcast channel according to an exemplary embodiment of the present disclosure; FIG. 2 is a configuration diagram illustrating an example of a channel searching unit illustrated in FIG. 1; and FIG. 3 is a diagram illustrating an example of broadcast channel searching directions of a first channel searching unit and a second channel searching unit of FIG. 1.

Referring to FIG. 1, an apparatus for searching a broadcast channel according to an exemplary embodiment of the present disclosure may include a channel searching unit 100, a controlling unit 200, and a decoder 300.

The channel searching unit 100 may serve to search broadcast channels of broadcast signals received from an antenna. Here, the channel searching unit 100 may include a first channel searching unit 110 and a second channel searching unit 120.

The first channel searching unit 110 and the second channel searching unit 120 may receive broadcast signals from separate antennas, respectively.

In an exemplary embodiment of the present disclosure, although not shown, the channel searching unit 100 may further include a broadcast signal distributing unit (not shown), and may distribute broadcast signals received from one antenna to the first channel searching unit 110 and the second channel searching unit 120 by the broadcast signal distributing unit (not shown).

The first channel searching unit 110 and the second channel searching unit 120 may search broadcast channels of the broadcast signals received from the antennas. The first channel searching unit 110 or the second channel searching unit 120 may search broadcast channels for each of different broadcasting standards.

Here, the first channel searching unit 110 or the second channel searching unit 120 may search broadcast channels of any one of a plurality of broadcasting standards. According to an exemplary embodiment of the present disclosure, the broadcasting standard may be any one of digital video broadcasting-terrestrial (DVB-T), DVB-T2, digital video broadcasting-cable (DVB-C), DVB-C2, digital video broadcasting-satellite (DVB-S), and DVB-S2 corresponding to digital broadcasting standards of Europe.

According to an exemplary embodiment of the present disclosure, the broadcasting standard may be any one of integrated service digital broadcasting-terrestrial (ISDB-T), DVB-T, DVB-T2, DVB-C, DVB-C2, DVB-S, and DVB-S2 corresponding to digital broadcasting standards of Brazil or Japan.

In addition, the broadcasting standard may be any one of advanced television system committee (ATSC), Opencable, DVB-S, and DVB-S2 corresponding to broadcasting standards of United States or Korea.

In addition, the broadcasting standard may be any one of digital terrestrial multimedia broadcast (DTMB) and DVB-C corresponding to broadcasting standards of China. These broadcasting standards may be appropriately changed depending on the broadcast signals received by the controlling unit 200.

In an exemplary embodiment of the present disclosure, the first and second channel searching units 110 and 120 may include tuners 112 and 122 and demodulators 114 and 124, respectively.

In detail, the tuners 112 and 122 may generate center frequency signals for each preset frequency band from the broadcast signals distributed from the antennas, respectively.

The demodulators 114 and 124 may demodulate the center frequency signals generated by tuners 112 and 122, respectively. Here, the demodulated center frequency signals may include broadcast channel information, image information, and audio information of corresponding frequency bands.

The demodulators 114 and 124 may output the image information and the audio information to the decoder 300, and output the broadcast channel information to the controlling unit 200.

The controlling unit 200 may serve to control the channel searching unit 110 to search the broadcast channels of the broadcast signals received from the antennas.

Here, the controlling unit 200 may control the first channel searching unit 100 to search broadcast channels included in a first broadcasting standard and control the second channel searching unit 120 to search broadcast channels corresponding to a second broadcasting standard.

In addition, the controlling unit 200 may receive a searching result from the channel searching unit 110 to generate effective channel list information, when the broadcast channel searching by the channel searching unit 100 ends.

In detail, the controlling unit 200 may receive a channel searching result included in the first broadcasting standard from the first channel searching unit 110 to generate effective channel list information of the first broadcasting standard, and may receive a channel searching result included in the second broadcasting standard from the second channel searching unit 120 to generate effective channel list information of the second broadcasting standard.

Here, in the case in which the number of broadcasting standards, which are searching targets, is four, the controlling unit 200 may control the first and second channel searching units 110 and 120 to search broadcast channels included in first and second broadcasting standards in parallel, respectively, control the first channel searching unit 110 to search channels for a third broadcasting standard when the channel searching for the first broadcasting standard by the first channel searching unit 110 ends, and control the second channel searching unit 120 to search channels for a fourth broadcasting standard when the channel searching for the second broadcasting standard by the second channel searching unit 120 ends.

Here, a sequence of the searched broadcasting standards may be changed by various exemplary embodiments.

For example, in the case of the digital broadcasting standards of Europe, the controlling unit 200 may control the first channel searching unit 110 to search broadcast channels of the DVB-T, and control the second channel searching unit 120 to search broadcast channels of the DVB-C.

Here, the controlling unit 200 may control the first channel searching unit 110 to search broadcast channels of the DVB-S when the broadcast channel searching of the DVB-T by the first channel searching unit 110 ends, and control the second channel searching unit 120 to search broadcast channels of the DVB-S2 when the broadcast channel searching of the DVB-C by the second channel searching unit 120 ends.

In an exemplary embodiment of the present disclosure, the controlling unit 200 may divide a frequency band of the broadcast signal into a first region and a second region, control the first channel searching unit 110 to search broadcast channels included in the first region, and control the second channel searching unit 120 to search broadcast channels included in the second region, in the case in which the first and second channel searching units 110 and 120 search broadcast channels included in the same broadcasting standard, as illustrated in FIG. 3.

In other words, the controlling unit 200 may divide a frequency band of the received broadcast signal into predetermined regions and control a plurality of channel searching units 110 and 120 to search broadcast channels in the divided regions, in the case in which broadcast channels included in one broadcasting standard are searched using the channel searching unit 100 including the plurality of channel searching units 110 and 120.

In detail, the controlling unit 200 may divide the frequency band of the broadcast signal in half, control the first channel searching unit 110 to search broadcast channels of a first region, which is one half, and control the second channel searching unit 120 to search broadcast channels of a second region, which is the other half.

Figure 4:
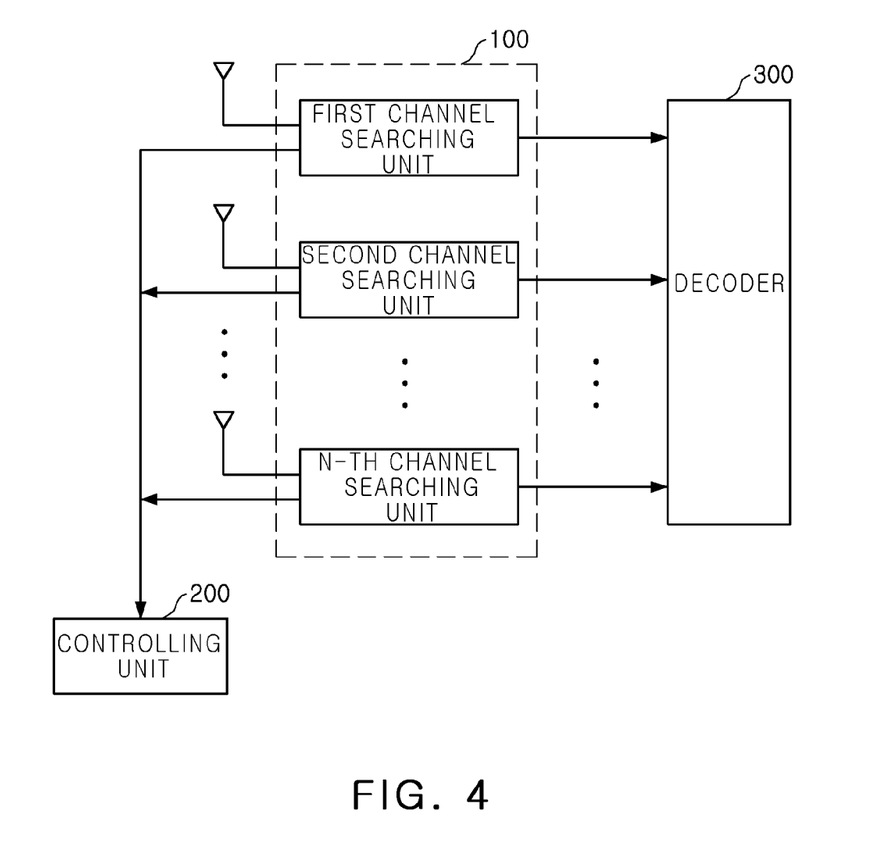
FIG. 4 is a configuration diagram illustrating an apparatus for searching a broadcast channel according to another exemplary embodiment of the present disclosure.

FIG. 4 is a configuration diagram illustrating an apparatus for searching a broadcast channel according to another exemplary embodiment of the present disclosure.

Referring to FIG. 4, an apparatus for searching a broadcast channel according to another exemplary embodiment of the present disclosure may include a plurality of channel searching units 100 searching broadcast channels of broadcast signals received from antennas and a controlling unit 200 controlling the plurality of channel searching units 100 to search broadcast channels included in different broadcasting standards, respectively, and receive searching results from the plurality of channel searching units 100 to generate effective channel list information.

Since a specific operation and a configuration of each of the channel searching unit 100 and the controlling unit 200 have been described above, a detailed description will be omitted.

In an exemplary embodiment of the present disclosure, the controlling unit 200 may control the plurality of channel searching units 100 to sequentially search the broadcast channels in a first direction, and control a channel searching unit first ending searching of the broadcast channels to sequentially search broadcast channels included in a broadcasting standard searched by a channel searching unit by which searching of the broadcast channels is the slowest among the plurality of channel searching units 100 in a second direction, in the case in which any one of the plurality of channel searching units 100 first ends the searching of the broadcast channels.

That is, the controlling unit 200 may control the channel searching unit first ending the searching of the broadcast channels to assist in the searching of the broadcast channels by the channel searching unit by which the searching of the broadcast channels is the slowest.

Figure 5:
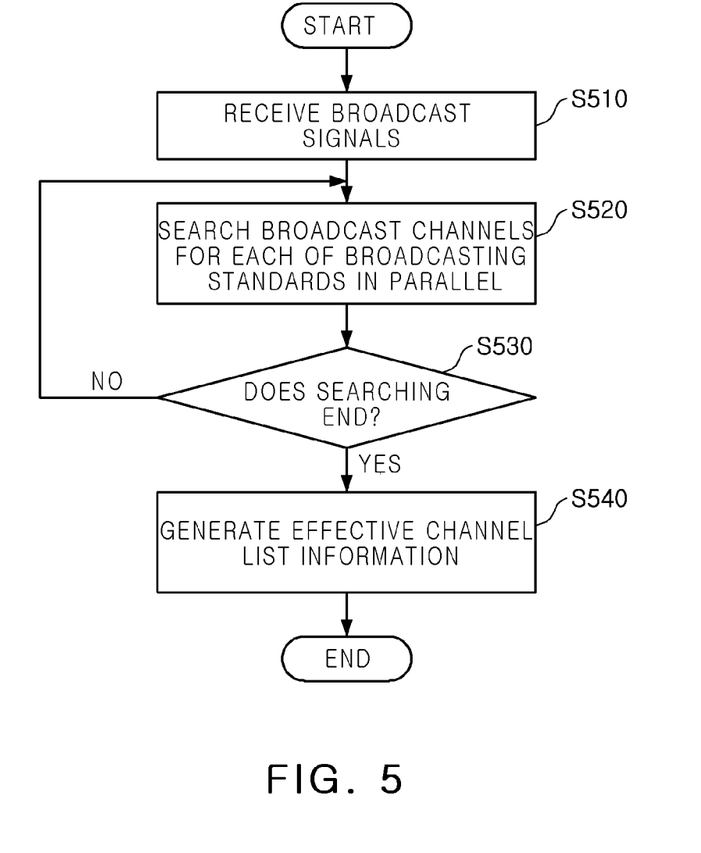
FIG. 5 is a flow chart illustrating a method for searching a broadcast channel according to an exemplary embodiment of the present disclosure.
Figure 6:
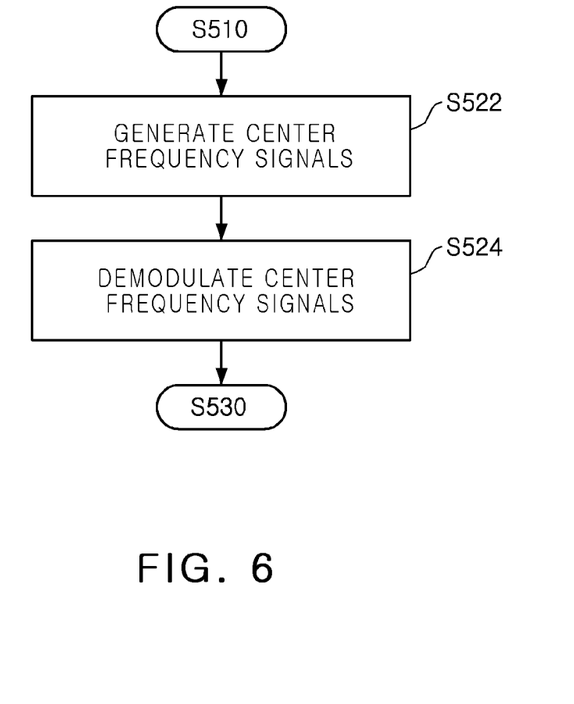
FIG. 6 is a flow chart illustrating an example of an operation of searching a broadcast channel of FIG. 5.

FIG. 5 is a flow chart illustrating a method for searching a broadcast channel according to an exemplary embodiment of the present disclosure; and FIG. 6 is a flowchart illustrating an example of an operation of searching a broadcast channel of FIG. 5.

Referring to FIGS. 5 and 6, a method for searching a broadcast channel according to an exemplary embodiment of the present disclosure may be implemented by the apparatus for searching a broadcast channel as illustrated in FIGS. 1 through 4.

First, the apparatus for searching a broadcast channel may first receive the broadcast signals through the antennas (S510) and search the broadcast channels for each of the plurality of broadcasting standards in parallel from the received broadcast signals (S520).

Here, the operation (S520) of searching a broadcast channel may include an operation (S522) of generating the center frequency signals of preset frequency bands from the broadcast signals and an operation (S524) of demodulating the generated center frequency signals to output channel information.

Next, the apparatus for searching a broadcast channel may generate the effective channel list information of the broadcast channels for each broadcasting standard (S540) in the case in which the searching of the broadcast channels for each broadcasting standard ends (S530).

As set forth above, according to exemplary embodiment of the present disclosure, the broadcast channels for each of the plurality of broadcasting standards may be searched in parallel using the plurality of channel searching units, whereby a channel searching time may be decreased.

In addition, the channel searching unit first ending the searching of the broadcast channels assists the channel searching unit that do not end the searching of the broadcast channels to search the broadcast channels, whereby a time required for searching the broadcast channels may be further decreased.

While exemplary embodiments have been shown and described above, it will be apparent to those skilled in the art that modifications and variations could be made without departing from the spirit and scope of the present disclosure as defined by the appended claims.

What is claimed is:

1. An apparatus for searching a broadcast channel, comprising:
    a channel searching unit including first and second channel searching units searching broadcast channels of broadcast signals received from antennas; and
    a controller communicatively coupled to the channel searching unit and configured to control the first channel searching unit to search broadcast channels included in a first broadcasting standard, control the second channel searching unit to search broadcast channels included in a second broadcasting standard, and receive searching results from the first and second channel searching units to generate effective channel list information for each of the first and second broadcasting standard,
    wherein the controller adds a particular broadcast channel searched by the channel searching units to the effective channel list information when the searching results include at least one of channel information, image information, and audio information retrieved from demodulated information on the particular broadcast channel,
    wherein the controller is further configured to divide a frequency band of the broadcast signal into a first region and a second region, control the first channel searching unit to search broadcast channels included in the first region, and control the second channel searching unit to search broadcast cannels included in the second region, in the case in which the first and second channel searching units search broadcast channels included in the same broadcasting standard.

2. The apparatus for searching a broadcast channel of claim 1, wherein the first broadcasting standard or the second broadcasting standard is any one of digital video broadcasting-terrestrial (DVB-T), DVB-T2, digital video broadcasting-cable (DVB-C), DVB-C2, digital video broadcasting-satellite (DVB-S), and DVB-S2.

3. The apparatus for searching a broadcast channel of claim 1, wherein the first broadcasting standard or the second broadcasting standard is any one of integrated service digital broadcasting-terrestrial (ISDB-T), DVB-T, DVB-T2, DVB-C, DVB-C2, DVB-S, and DVB-S2 .

4. The apparatus for searching a broadcast channel of claim 1, wherein the first broadcasting standard or the second broadcasting standard is any one of advanced television system committee (ATSC), Opencable, DVB-S, and DVB-S2.

5. The apparatus for searching a broadcast channel of claim 1, wherein the first broadcasting standard or the second broadcasting standard is any one of digital terrestrial multimedia broadcast (DTMB) and DVB-C.

6. The apparatus for searching a broadcast channel of claim 1, wherein the first channel searching unit includes:
    a tuner configured to generate center frequency signals for each preset frequency band from the broadcast signals; and
    a demodulator configured to demodulate the center frequency signals to output channel information.

7. The apparatus for searching a broadcast channel of claim 1, wherein the second channel searching unit includes:
    a tuner configured to generate center frequency signals for each preset frequency band from the broadcast signals; and
    a demodulator configured to demodulate the center frequency signals to output channel information.

8. An apparatus for searching a broadcast channel, comprising:
    a plurality of channel searching units configured to search broadcast channels of broadcast signals received from antennas; and
    a controller configured to control the plurality of channel searching units to search broadcast channels included in different broadcasting standards, respectively, and receive searching results from the plurality of channel searching units to generate effective channel list information for each of the different broadcasting standards,
    wherein the controller adds a particular broadcast channel searched by the channel searching units to the effective channel list information when the searching results include at least one of channel information, image information, and audio information retrieved from demodulated information on the particular broadcast channel,
    wherein the controller controls the plurality of channel searching units to sequentially search the broadcast channels in a first direction, and controls a channel searching unit first ending searching of the broadcast channels to sequentially search broadcast channels included in a broadcasting standard searched by a channel searching unit by which searching of the broadcast channels is the slowest among the plurality of channel searching units in a second direction, in the case in which any one of the plurality of channel searching units first ends the searching of the broadcast channels.

9. The apparatus for searching a broadcast channel of claim 8, wherein each of the plurality of channel searching units includes:
    a tuner configured to generate center frequency signals for each preset frequency band from the broadcast signals; and
    a demodulator configured to demodulate the center frequency signals to output channel information.

10. The apparatus for searching a broadcast channel of claim 8, wherein the first broadcasting standard or the second broadcasting standard is any one of DVB-T, DVB-T2, DVB-C, DVB-C2, DVB-S, and DVB-S2.

11. The apparatus for searching a broadcast channel of claim 8, wherein the first broadcasting standard or the second broadcasting standard is any one of ISDB-T, DVB-T, DVB-T2, DVB-C, DVB-C2, DVB-S, and DVB-S2.

12. The apparatus for searching a broadcast channel of claim 8, wherein the first broadcasting standard or the second broadcasting standard is any one of ATSC, Opencable, DVB-S, and DVB-S2.

13. The apparatus for searching a broadcast channel of claim 8, wherein the first broadcasting standard or the second broadcasting standard is any one of DTMB and DVB-C.

* * * * *